United States Patent
Thomason et al.

[15] 3,692,974
[45] Sept. 19, 1972

[54] AUTOMATIC WELDING HOOD WITH AUTOMATICALLY POSITIONED EYE SHIELD

[72] Inventors: James P. Thomason, Jasper, Ga. 30143; Thomas Harold Jennings, 2640 Whitehurst Dr., Marietta, Ga. 30060

[22] Filed: Oct. 26, 1970

[21] Appl. No.: 83,758

[52] U.S. Cl..................................219/147, 219/132
[51] Int. Cl..........................B23k 9/10, B23k 9/32
[58] Field of Search..............219/147, 108, 124–126, 219/130, 131 R, 132, 136, 138–144, 147

[56] References Cited

UNITED STATES PATENTS

| | | | |
|---|---|---|---|
| 2,761,046 | 8/1956 | Herrick et al. | 219/147 |
| 3,501,613 | 3/1970 | Cornell | 219/130 |
| 2,582,860 | 1/1952 | Clerke | 219/147 |
| 2,036,224 | 4/1936 | Lincoln et al. | 219/147 |
| 3,096,430 | 7/1963 | Farr | 219/147 |

Primary Examiner—R. F. Staubly
Attorney—Newton, Hopkins & Ormsby

[57] ABSTRACT

A welding hood having an electromechanical system for automatically opening and closing a hinged eye shield located thereon and for controlling energization of the welding gun at the beginning or end of a welding operation. On starting the welding process, a manually operated switch actuates a first solenoid valve which stops the flow of fluid to a piston connected to the eye shield, thereby allowing a spring providing an opposing force to move the eye shield to its protective position in front of the welding operator's eyes. The switch also actuates a second solenoid valve which allows an inert gas to flow through the welding gun. As the eye shield assumes its protective closed position, a microswitch is actuated along with a relay coil, completing a circuit allowing the welding gun to energize. Upon compeltion of the welding process, the eye shield automatically retracts so that the operator may view his work.

1 Claim, 4 Drawing Figures

PATENTED SEP 19 1972  3,692,974

INVENTORS
THOMAS HAROLD JENNINGS
JAMES P. THOMASON
BY Newton, Hopkins, & Ormsby
ATTORNEYS

AUTOMATIC WELDING HOOD WITH AUTOMATICALLY POSITIONED EYE SHIELD

BACKGROUND OF THE INVENTION

1. Field of the Invention

This invention relates to welding hoods, and more particularly to welding hoods having automatic controls for opening and closing an eye shield mounted thereon in conjunction with the starting and finishing of welding operations.

2. Description of the Prior Art

Welding hoods including movable eye shields positioned in front of the welding operator's eyes are well known in the art. Such eye shields generally comprise a forwardly protruding upwardly hinged rectangular frame having mounted therein a light-filtering protective lens which is usually a piece of dark, opaque, or polarizing glass, plastic, or similar light-filtering material. The glass in the eye shield is sufficiently dark or opaque to protect the operator's eyes from sparks and intense light, while at the same time transmitting sufficient light to allow him to view the welding process. Such eye shields are especially necessary to protect the eyes from the intense glare and sparks produced by arc welding or oxy-acetylene welding. However, the very opaqueness of the mask is such as to make viewing of the work difficult in the absence of a bright light source such as the welding arc. Therefore, in order to view the welding work when the welding torch is removed or turned off, it is necessary that the light-filtering protective lens be removed from the operator's field of vision.

While such viewing may be achieved by removing the welding hood, this is an awkward and time-consuming method. Accordingly, many welding hoods in use today are provided with hinged eye shields in order to allow movement of the eye shield out of the operator's field of vision without the necessity of moving or removing the welding hood itself. Many devices have been proposed in the prior art by which the eye shield can be automatically moved from its raised inoperative position out of the operator's line of vision to its closed protective position in front of the operator's eyes and back again, in order to avoid the necessity of manual movements by the operator. Some of these systems employ voltage variations in the electrical circuitry, utilizing various linkage systems, as means by which switches in the welding circuit are kept open until the eye shield is moved into its protective position. With the eye shield in its protective operative position, a welding circuit is completed and the welding operation can begin. Such systems have heretofore been relatively complex and susceptible to malfunctioning.

Other prior art proposals have included systems which require the welding process to first begin so that the welding electrode itself may act as a contact, completing a circuit which by a suitable linkage system causes the eye shield to close to the protective position. Such methods are potentially hazardous to the operator, since the arc must be formed before the eye shield is placed in the protective position. In addition, systems have heretofore been proposed employing various mechanical devices whereby the operator himself positions the eye shield. These are disadvantages in requiring the use of a free hand, which the welding operator may not have conveniently available.

These and many other devices heretofore proposed, while theoretically satisfactory, have in actual use been often found to be cumbersome, expensive, and susceptible to malfunctioning in insuring that the protective eye shield on the welding hood was closed to its operative position before the welding arc was formed. Even a slight amount of unpredictability in the operation of such an eye shield creates a dangerous safety hazard for the operator's eyes, due to the extremely intense light given off by the welding arc.

SUMMARY OF THE INVENTION

An object of this invention is to provide a welder's hood having an eye shield which will be automatically positioned properly in front of the operator's eyes at the beginning of the welding operations.

Another object of the present invention is to provide an eye shield on a welding hood which will insure that the welding process will not begin until the eye shield is in the closed operative position.

A further object of the present invention is to provide an eye shield on a welding hood which will be automatically positioned properly with respect to the operator's eyes regardless of movements of the operator's head.

Yet another object of this invention is to provide an eye shield on a welding hood which is automatically moved to a raised inoperative position outside of the operator's field of vision upon completion of the welding process.

A still further object of this invention is to provide simple, safe, and reliable means for automatically controlling the proper positioning of an eye shield on a welding hood.

The foregoing and other objects are obtained in accordance with the present invention which provides a welding hood having a unique electro-mechanical system for automatically positioning an eye shield mounted thereon between its protective closed position and its inoperative raised position. A pivotally mounted eye shield is provided with operative positioning means such as a spring tending to hold the eye shield in its protective closed position in front of the operator's eyes and perpendicular to his line of sight. A fluid cylinder mechanism is connected through a first solenoid fluid supply valve to a pressurized fluid supply source which, when the valve is open, allows the cylinder mechanism to overcome the spring, causing the eye shield to move to a raised inoperative position. A manually operated switch actuates the first solenoid fluid supply valve, closing the valve and thus stopping the flow of pressurized fluid to the fluid cylinder mechanism. This permits decompression of the cylinder, thereby allowing the spring to move the eye shield into its protective closed position. A second solenoid inert gas control valve is wired through the manually operated switch in parallel with the first solenoid fluid supply valve. Upon triggering the manual switch, the second valve is simultaneously opened, allowing an inert gas mixture to flow to the welding gun. When the eye shield has assumed its closed protective position, microswitch triggering means mounted thereon actuate a microswitch and relay coil, completing a circuit allowing the welding gun to energize, and welding operations may begin.

Upon completion of the welding operations, the operator trips a switch to stop the flow of the welding gun energizing current. The cessation of current flow through the first solenoid fluid supply valve causes it to open, allowing the pressurized fluid to again flow into the fluid cylinder mechanism. The now-pressurized fluid cylinder mechanism overcomes the spring, moving the eye shield to its raised inoperative position. As the eye shield pivots upwardly, the microswitch triggering means deactivate the microswitch and relay coil, cutting off the current flowing therethrough to the welding gun. Since the solenoid inert gas control valve is wired in parallel with the first solenoid fluid supply valve, current simultaneously ceases to flow therethrough, closing the valve and cutting off the supply of inert gas to the welding gun.

BRIEF DESCRIPTION OF THE DRAWINGS

These and other objects, features and advantages of the invention will become more fully apparent to those skilled in the art from the following description of an illustrative embodiment of the invention, as shown in the annexed Drawings, wherein like reference characters designate like or corresponding parts throughout the several Figures, and in which.

DESCRIPTION OF AN ILLUSTRATIVE EMBODIMENT

Figure 1:
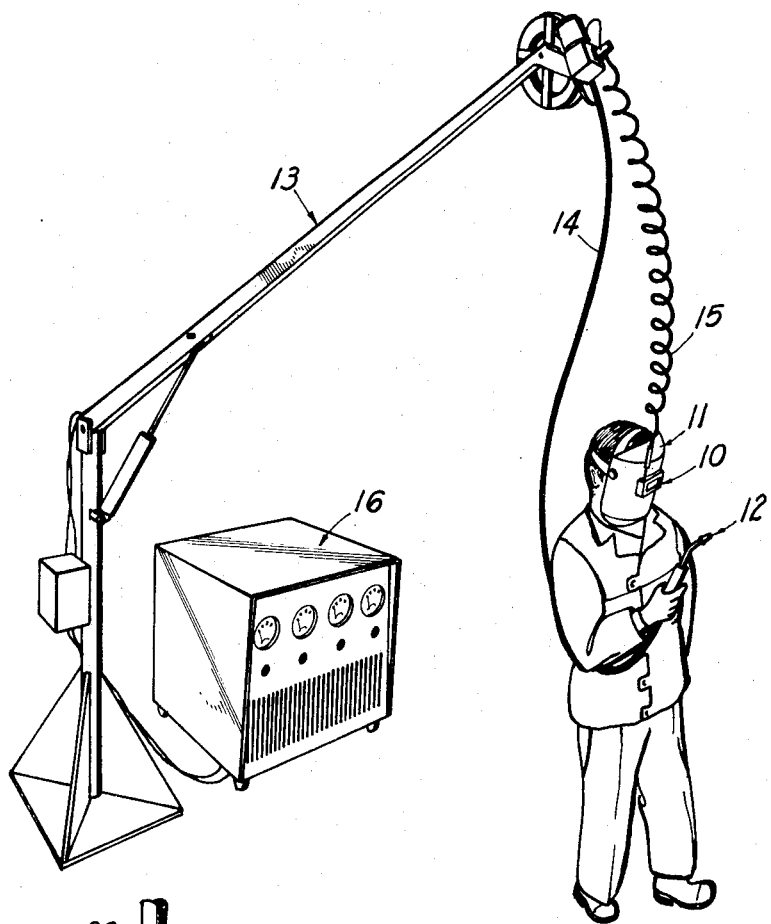
FIG. 1 is a schematic perspective view of a welder wearing a hood of the present invention, together with associated welding equipment.

While it will be understood by those skilled in the art that with only minor variations the present invention may be used in oxy-acetylene welding and other types of welding, for purposes of simplicity in illustration, the following description will be directed to an embodiment suitable for arc welding. Such an embodiment is schematically illustrated in FIG. 1, wherein a welding operator and the welding apparatus are depicted. As is conventional in the welding art, a hinged eye shield 10 containing a light-filtering protective lens 20 is mounted on a welding mask or hood 11, which is worn over the face of the welding operator. The operator is shown holding a welding gun 12, which may be of any suitable type. A boom 13 guides a welding electrode 14 and fluid and electrical lines, generally depicted as numeral 15, which are necessary for the operation of eye shield 10. A suitable electrical power generator 16 supplies electrical power for the welding process itself, as well as for the electro-mechanical device of the present invention. A source of inert gas for the welding apparatus, and a source of gas or liquid fluid for the eye shield mechanism are not shown, such sources being well known in the art.

Figure 2:
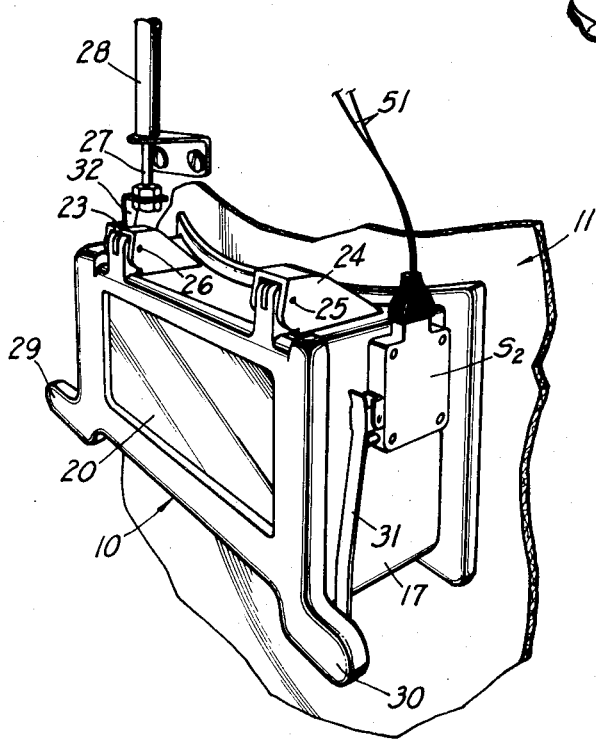
FIG. 2 is a detailed perspective view of an eye shield mechanism of the present invention mounted on a welding hood.
Figure 3:
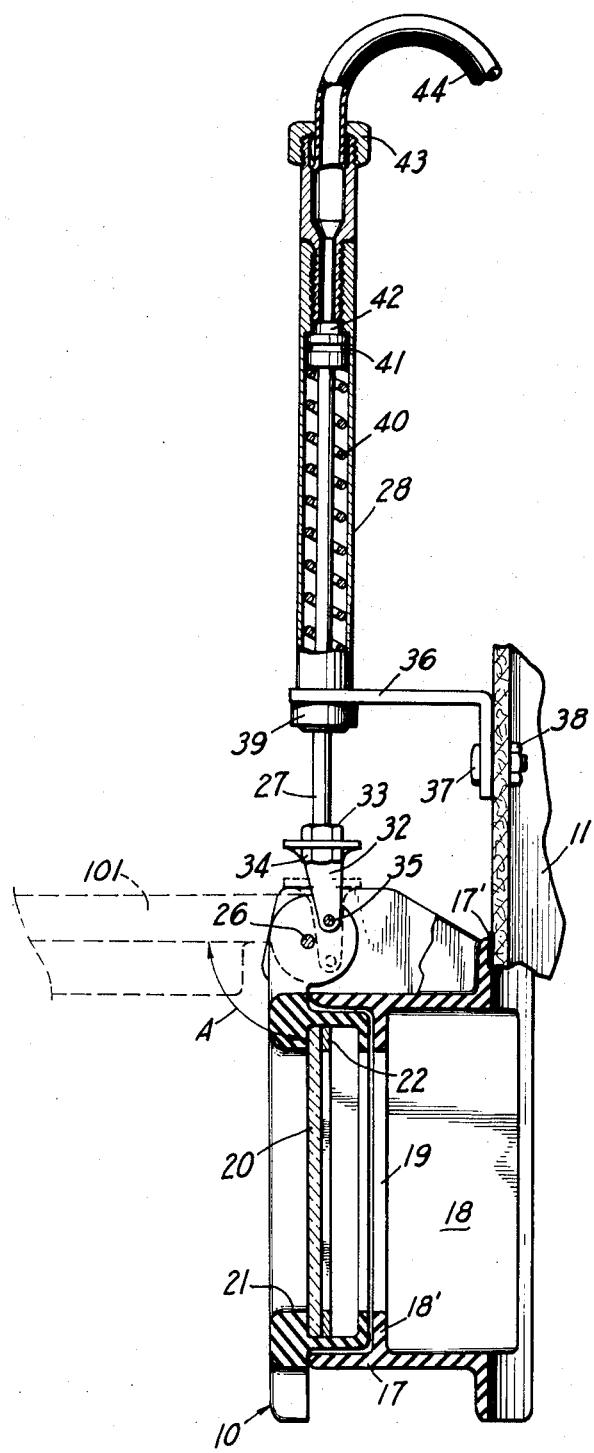
FIG. 3 is a vertical cross-section taken through an eye shield and adjoining hood parts.

The welding hood 11 is of a type ordinarily used in the art, which rests upon the operator's head or shoulders. As shown in FIGS. 2 and 3, the hoods provided with an opening in front of the operator's eyes, around which an eye shield supporting frame 17 is mounted. The supporting frame 17 is mechanically secured to the welding hood 11 by suitable means, such as weld 17' or the like, and provides a hollow housing 18 therein. A clear safety lens 19 is supported vertically within the hollow housing 18 by an inwardly extending flange 18' integrally formed on supporting frame 17. Safety lens 19 may be constructed of glass, plastic, or any other suitable transparent material, and is clear rather than opaque in order to protect the operator's eyes from foreign objects. In front of the clear safety lens 19 and vertically mounted in the eye shield is a light-filtering protective lens 20, which is vertically supported by any suitable supporting means, such, for example, as a lip 21 of the eye shield frame. The light-filtering protective lens is generally constructed of opaque or polarizing glass, plastic, or other suitable material, as known in the art, and may be secured from the inside within the eye shield by any suitable means, such as a leaf-type spring retainer shown at 22. While as previously stated, any suitable means may be used to support the light-filtering protective lens in its vertical position, the above construction is commonly used because it offers easy interchangeability and replacement of the light-filtering protective lens.

Hinge blocks 23 and 24 are secured to the top of the eye shield supporting frame 17 by welding or the like. The eye shield is hinged about pins 26 and 26 to blocks 23 and 24 so as to allow movement within roughly a 90° arc, as shown at A, between a closed operative position 20 and a raised operative position shown in dashed lines at 101.

As best seen by reference to FIG. 2, microswitch triggering means such as tabular protrusion 30 extend laterally and outwardly from the bottom outer corners of eye shield 10. When the eye shield is in its closed operative position, protrusion 30 engages a movable contact 31 mounted on a microswitch S2, which is located on the outside of eye shield supporting frame 17. On the opposite side of the eye shield, a second tabular protrusion 29 may be provided. Either protrusion allows the operator to manually raise or lower the eye shield if he so desires.

In accordance with the present invention, a pivotally mounted eye shield, for example, of the type shown comprising a forwardly protruding rectangular frame pivotally mounted over a suitable opening in the welding hood in front of the operator's eyes and having a light-filtering lens and, if desired, a second clear safety lens mounted therein, is provided with operative positioning means such as a spring 40, FIG. 3, which tends to hold the eye shield in its protective closed position in front of the operator's eyes and perpendicular to his line of sight. Spring 40 is located within a fluid cylinder 28 having a piston rod 27 extending outwardly therefrom. In the absence of a greater opposing force, the spring maintains a piston head and associated rod 27 in the raised position shown in the Drawing. The end of the piston rod 27 is linked to eye shield 10 via a suitable lever arm 32. The lever arm is fixedly secured at the lower end of piston rod 27 by any conventional means, such as nuts 33 and 34. The lever arm 32 is pivotally linked in cam fashion to hinge block 23, FIGS. 2 and 3, by a connecting pin 35, to permit the desired pivotal rotation of the eye shield 10 around the connecting pin. The fluid cylinder mechanism is supported vertically above the eye shield by suitable mechanical securing means. In one suitable arrangement, an L-shaped bracket 36 is secured at one end to the welding hood 11 by bolt 37 and nut 38, and the L-shaped bracket is secured at the other end thereof to support the fluid cylinder 28 by a threaded cylinder cap member 39. A suitable sealing means, such as O-ring 41, sealingly secures piston head 42 of piston rod 27 within the fluid cylinder. The O-ring is generally disposed within an annular groove around the outside of the piston head, as shown in FIG. 3. A suitable threaded fluid fitting 43 is provided at the top of cylinder 28 for connecting either a hydraulic or pneumatic fluid system thereto. Fluid line 44 supplies fluid through the fitting to cylinder 28 via a solenoid fluid control valve 45, as shown schematically in FIG. 4. It will be apparent that upon the introduction of pressurized fluid, the piston will be forced downwardly, compressing the spring 40 therein. In the absence of a pressurized fluid supply, the spring 40 will maintain the piston in its raised position, thereby maintaining the eye shield in its closed operative position. With the eye shield in its operative or closed position, the fluid supplied to cylinder 28 is off, and lever arm 32 is in its raised position, with the connecting pin 35 disposed upwardly and rearwardly to pivotal connecting pin 26, located centrally in hinge block 23. When piston 27 is compressed by reason of fluid pressure supplied from fluid line 44, lever arm 32 is forced downward by the downward movement of piston rod 27, thereby pivoting the eye shield 10 upwardly through a roughly 90 degree arc to the open inoperative position, indicated at 101. With the eye shield in the inoperative position, the connecting pin 35 appears at a location downward and rearward of connecting pin 26 of hinge block 23, as shown in FIG. 3.

It will be apparent to those skilled in the art that any suitable design modification may be utilized which will effectively provide opposing forces tending to open or close the eye shield. Thus, it will be apparent that there is no necessity for locating the operative positioning means such as spring 40 within the fluid cylinder. The same effect may be obtained by mounting it in opposition to the fluid cylinder on the side of eye shield supporting frame 17. Other suitable arrangements will be readily apparent to those skilled in the art.

Figure 4:
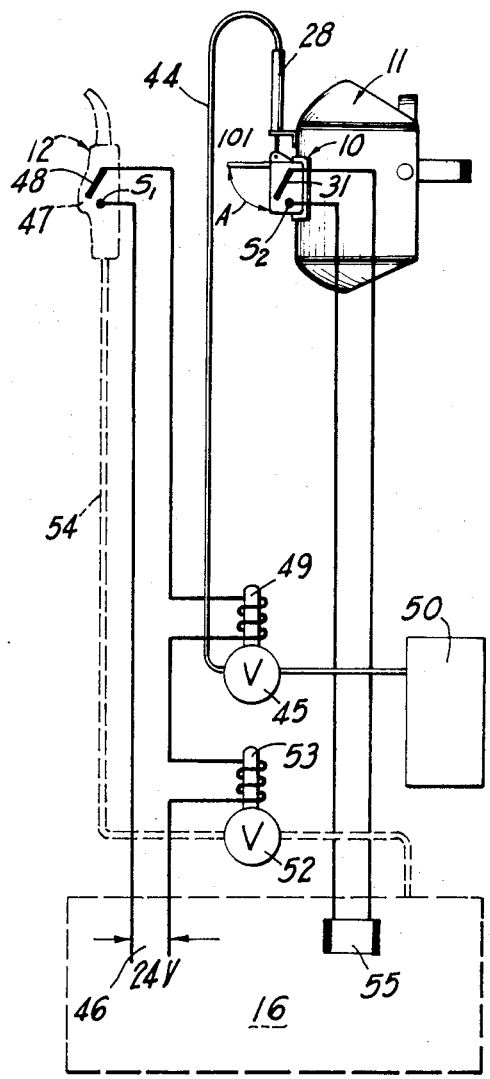
FIG. 4 is a schematic diagram of a welding hood of the present invention as in combination with a welder and associated apparatus.

A suitable wiring arrangement for the electromechanical system of the present invention in combination with a conventional welding apparatus is schematically illustrated in FIG. 4. As shown therein, a suitable electrical power source 46 is provided within a standard welding generator 16. A power source of only 24 volts is sufficient to operate the device of the present invention. Located on the welding gun 12, or provided as a foot switch (not shown), a manually activated switch S1 is operated by pressing a trigger 47, actuating movable contact 48 and thereby closing the switch. This operation is performed when the welding operator desires the welding process to begin. A wound coil 49 of solenoid fluid control valve 45 is electrically connected to switch S1. The solenoid fluid control valve 45 is preferably located on the welding boom 13, as shown in FIG. 1, in order to keep it free from the welding work area. This valve connects fluid line 44 with a pressurized fluid supply source 50. As previously mentioned, the fluid may be either hydraulic or pneumatic. Fluid line 44 and electrical wires 51 are shown in FIG. 1 supported by the welding boom 13 so as to be kept out of the operator's way. They may, as illustrated at 15 in FIG. 1, be spring coiled in order to keep them in the clear.

Wired in series with solenoid fluid control valve 45 is a wound coil 53 of a solenoid gas purge valve 52. When open, this valve permits an inert gas mixture, such as argon, argon-carbon dioxide, or the like to pass from a supply source (not shown) through the welding gun 12 via gas line 54. The solenoid gas purge valve 52 may also be located on welding boom 13, if desired.

When the protective eye shield has been moved to its closed operative position, the movable contact 31 on switch S2 located on the side of the supporting frame 17 is closed, completing a circuit from the switch S2 to the main welding power source located within the welder 16.

To summarize the operation of the device in accordance with the present invention, the operator presses trigger 47 on the welding gun, contacting movable contact 48 which closes switch S1. As switch S1 is closed, electrical current flows to coil 49 of solenoid fluid control valve 45, closing the valve to stop the flow of pressurized fluid through fluid line 44. The cessation of fluid flow permits decompression of piston 27 by opposing operative positioning means, such as the spring shown, thereby allowing the piston to return to a raised position within cylinder 28. As the piston rises, the lever arm 32 which connects piston rod 27 with eye shield 10 also rises, causing the eye shield to pivot approximately 90° from its inoperative open position 101 to its operative closed position parallel to the surface of the welding hood, shielding the operator's eyes.

At the same time, closing of switch S1 energizes coil 53 of solenoid gas purge valve 52, opening the valve. Inert gas flows along gas line 54 to the welding gun 12 prior to the actual welding process.

As the eye shield assumes its closed operative position, switch S2 is closed by forcing contact 31 into a closed position. This allows current to flow through relay coil 55, which is energized by the increased voltage therein, allowing the current to flow back to power source in the welder 16, thereby completing the electro-mechanical circuit. Upon completion of the circuit, the main welding current begins to flow and the operator may begin welding operations.

When the operator has completed welding, the operation is reversed. Release of trigger 47 deactivates movable contact 48, stopping the flow of main welding current by opening switch S1. Current thus ceases to flow through coil 49, causing the solenoid fluid control valve 45 to open. With this valve open, hydraulic or pneumatic fluid may flow through fluid line 44 to compress piston 27. This compression overcomes the operative positioning means, lowering the piston. Lever arm 32, which is attached to the piston rod, acts as a cam, causing the pivotal upward rotation of eye shield 10 around connecting pin 26 in hinge block 23. The eye shield thus pivots upwardly approximately 90° to the inoperative raised position shown at 101 in FIG. 3. As the eye shield pivots upwardly, the protruding tab 30 on the outside frame thereof disengages switch S2. The switch thus opens, and current ceases to flow through relay coil 55 and power source 46. Simultaneously, the opening of switch S1 cuts off current flow through coil 53. The solenoid gas purge valve 52 thus closes, cutting off the supply of inert gas to the welding gun.

It will be apparent that the device of the present invention does not allow flow of the main welding current until the solenoid fluid valve 45 has been closed, thereby causing the piston 27 to move the eye shield 10 to its operative position 101. As this operative position is assumed, contact is made with switch S2, along with relay coil 45, completing the electrical circuit and allowing flow of the main welding current. Because the main welding current cannot flow unless the eye shield is in its operative position, this avoids a safety hazard to the operator, since welding current will flow only when the protective eye shield is operatively positioned in front of his eyes. When welding operations have ceased, the eye shield is automatically raised out of the operator's line of sight, thereby allowing him to inspect his work. These functions are performed automatically, and therefore do not require any attention or extra steps to be taken by the operator. Thus, a safety hazard has been eliminated without introducing any additional activity on the part of the operator.

It will be appreciated that while the foregoing disclosure relates only to an illustrative embodiment of the invention suitable for use in arc welding, it is capable of modification for various other types of welding, and will provide an improved welding hood suitable for use under different welding conditions. While shown mounted on a welding hood, the device of the present invention can with equivalent results be mounted on a welding mask. Also, for example, the apparatus of the present invention may readily be adapted for use in oxy-acetylene welding by providing a solenoid valve for the flow of the welding gas mixture to remove the main welding current source 46, and by providing a spark generator for ignition of the oxy-acetylene mixture upon closure of the electro-mechanical system. Accordingly, these and numerous other modifications or alterations may be made by those skilled in the art without departing from the spirit and scope of the invention as set forth in the appended claim.

What is claimed as new and desired to be secured by Letters Patent of the United States is:

1. A welding system comprising a welding means, an electric circuit for controlling the operation of said welding means, a welding hood having an eye shield mounted thereon, said shield being movable between an operative position in the line of sight of a welder wearing said hood and an inoperative position removed from such line, a switch mounted on said hood and controlling the circuit for said welding means, means connecting said switch with said eye shield in such a manner that the switch will be closed when the shield is in operative position and open when the shield is in inoperative position, whereby the welding means will be rendered inoperative unless the shield is in operative position; means for moving said eye shield between its operative and inoperative positions, comprising a cylinder, a piston therein operatively connected to said eye shield, a spring urging said piston toward a position in which said eye shield is in operative position, means for supplying fluid to said cylinder to cause the piston to move against the action of the spring, thereby moving said eye shield to inoperative position, a valve for controlling said fluid supplying means, means for supplying a flow of inert gas to said welding means, a valve for controlling the supply of such gas, solenoid means connected with both said valves and adapted, in one position to simultaneously close the valve controlling the supply of fluid to said cylinder and open the valve controlling the supply of inert gas and in another position to open the former valve and close the latter valve, and a switch for controlling the supply of current to said solenoid means.

* * * * *